United States Patent [19]  
Prevorsek et al.

[11] 4,150,567  
[45] Apr. 24, 1979

[54] METHOD OF ESTIMATING ENERGY LOSS FROM PNEUMATIC TIRES

[75] Inventors: Dusan C. Prevorsek; Young D. Kwon; Raj K. Sharma, all of Morristown, N.J.

[73] Assignee: Allied Chemical Corporation, Morris Township, Morris County, N.J.

[21] Appl. No.: 920,591

[22] Filed: Jun. 29, 1978

[51] Int. Cl.² .......................................... G01M 17/02
[52] U.S. Cl. .................................................... 73/146
[58] Field of Search ................................ 73/146, 15.6

[56] References Cited

U.S. PATENT DOCUMENTS 3,934,452  1/1976  Prevorsek et al. .................. 73/15.6

Primary Examiner—Donald O. Woodiel

Attorney, Agent, or Firm—Robert A. Harman; Robert J. North

[57] ABSTRACT

By wheel testing two tires having different construction parameters, e.g. different tire cords and measuring the temperatures at a few points within each tire body; and by measurement with a high strain dynamic viscoelastometer, the heat generation rate and dynamic tensile moduli (at various temperatures, strain frequencies and tensions) of the cords and rubber used in each tire are determined, where the values of the exponents "X" in the general equation relating cyclic strain amplitude, S, in the tire cord and in the rubber of each tire vs. the dynamic tensile moduli, E, for cords and rubber, at given temperature can be determined in the form: $S_A/S_B = (E_B/E_A)^X$.

1 Claim, 7 Drawing Figures

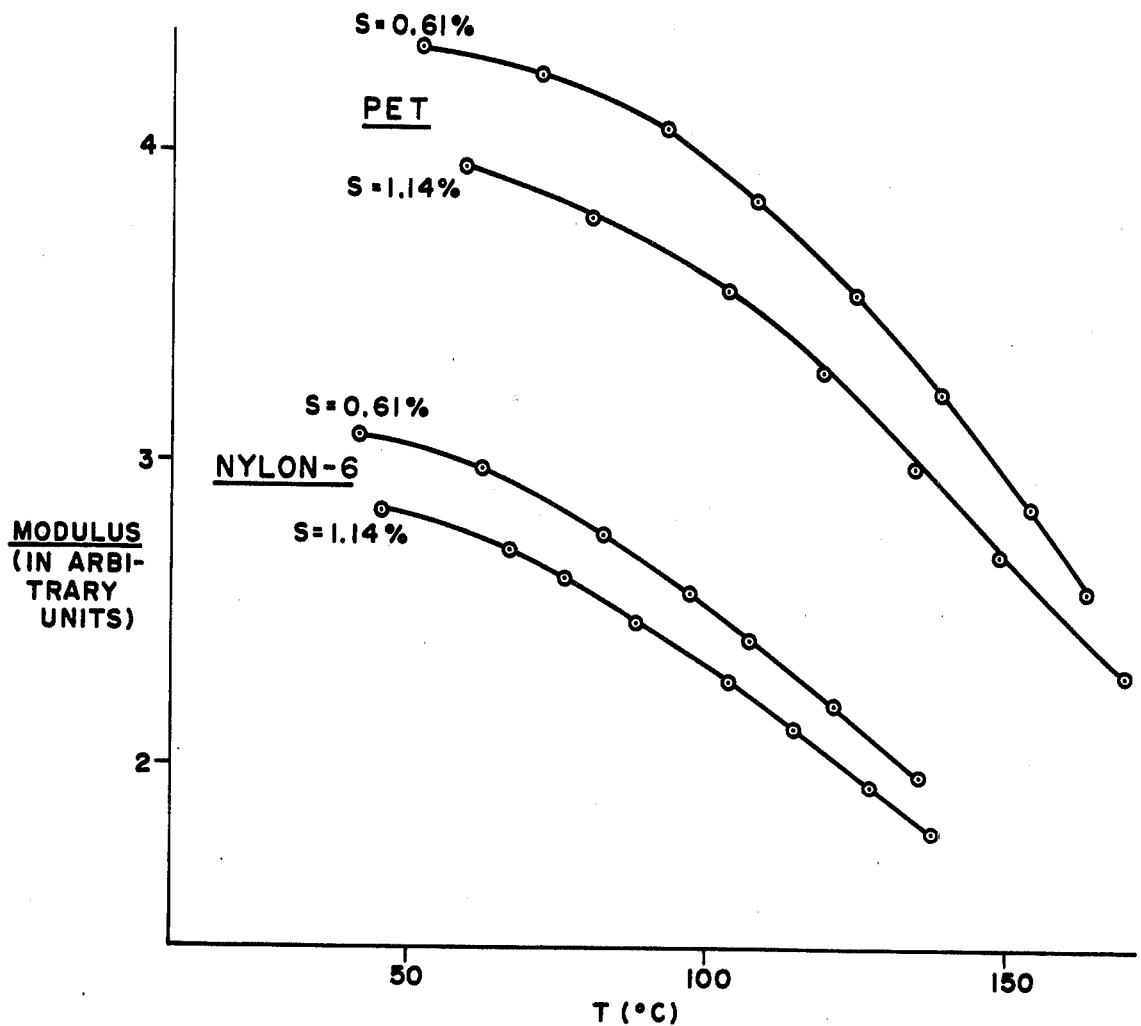
FIG. 1 MODULUS vs. TEMPERATURE OF NYLON-6 AND PET CORDS AT GIVEN STRAIN AMPLITUDES, S.
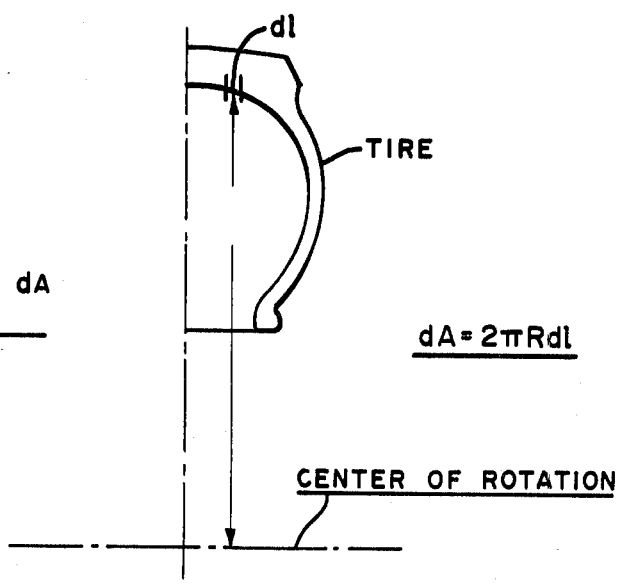
FIG. 6
THE AREA ELEMENT dA OF TIRE SURFACE
$dA = 2\pi R dl$

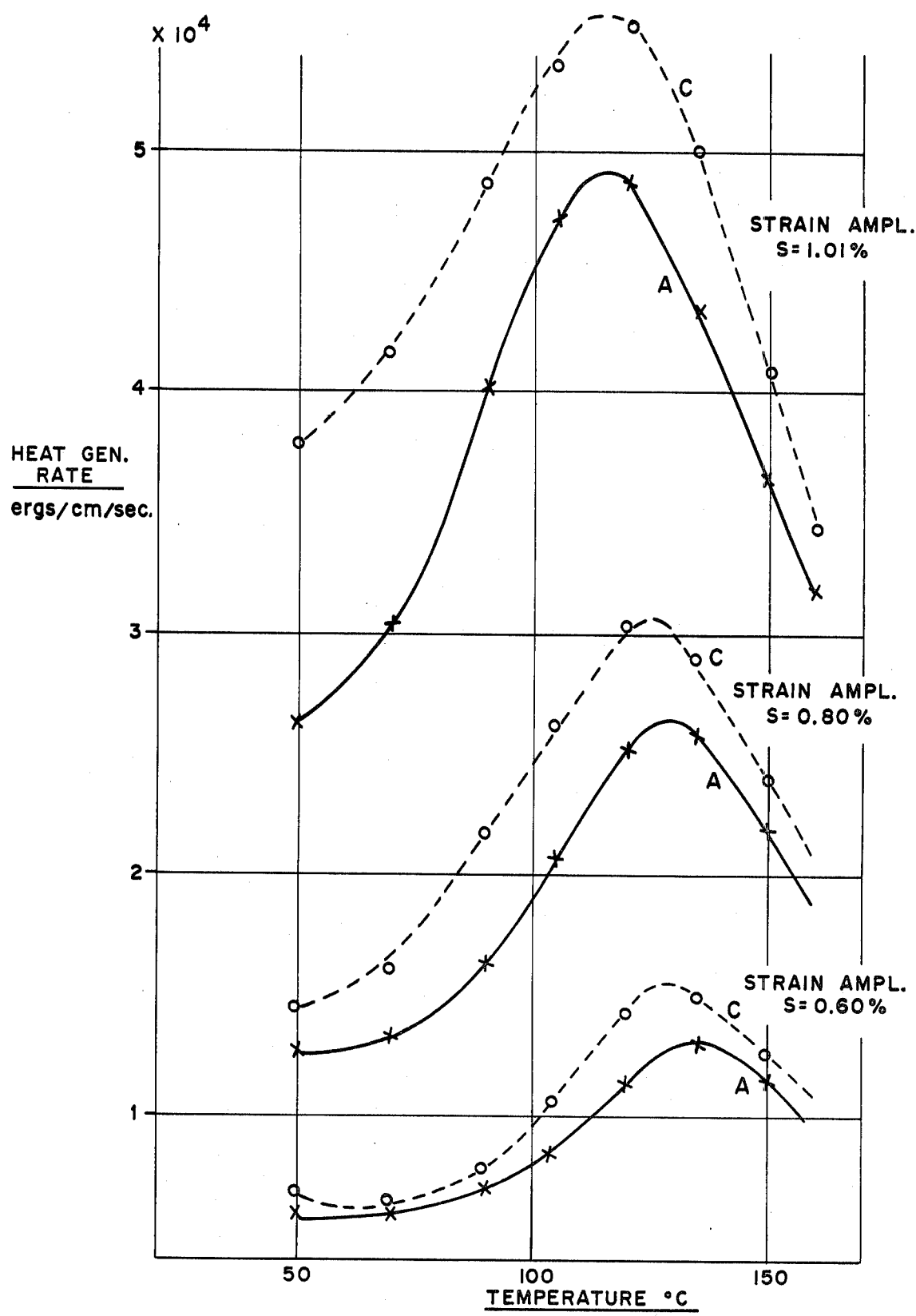
FIG. 2 HEAT GENERATION RATE OF NYLON-6 CORDS vs. TEMPERATURE

MEASUREMENT OF TIRE TEMPERATURE 1,2,3,4,5,6,7,8 = THERMOCOUPLES

TIRE CROSS SECTION

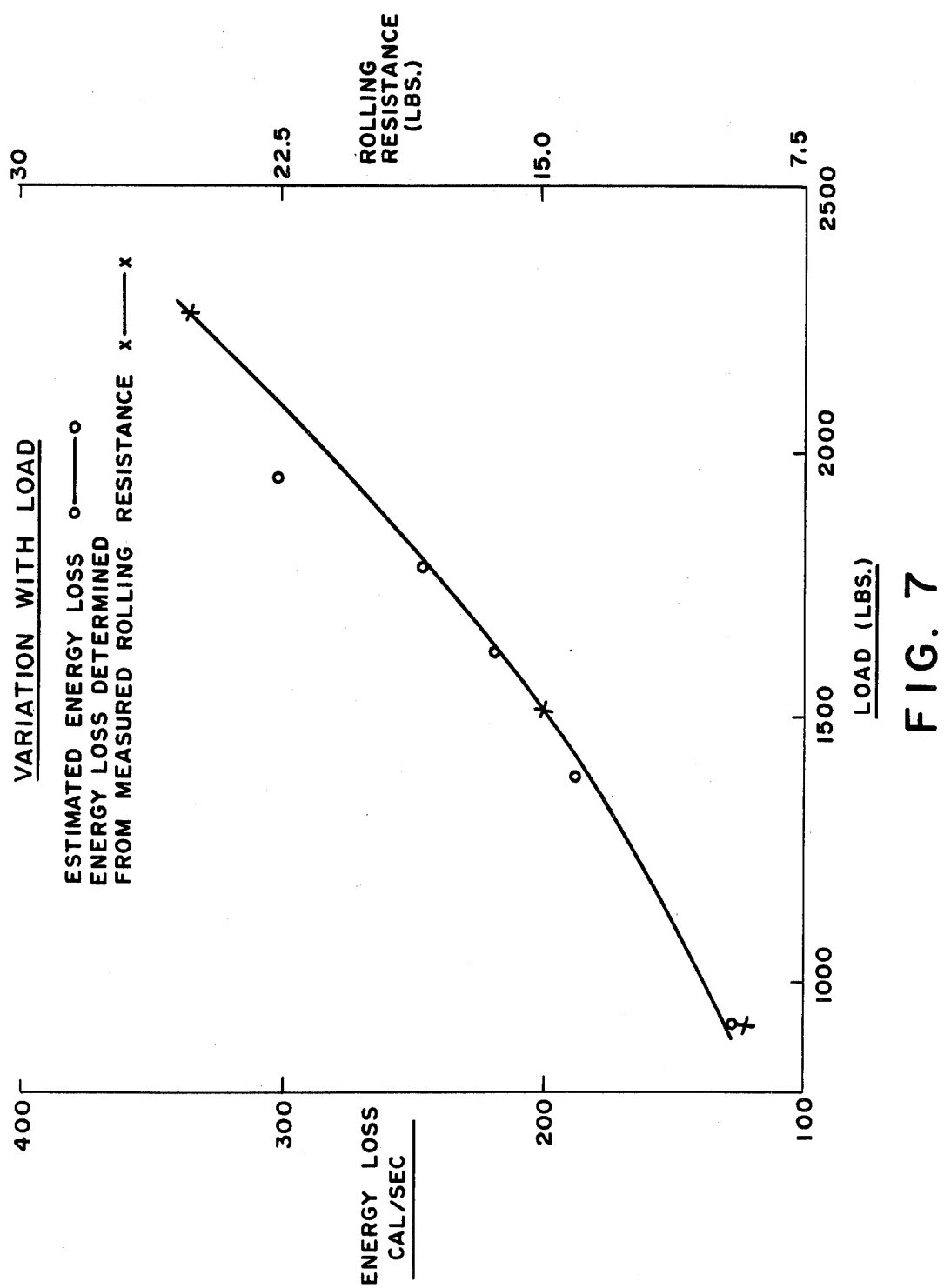

METHOD OF ESTIMATING ENERGY LOSS FROM PNEUMATIC TIRES

BACKGROUND

This invention relates to a method for estimating the effect upon fuel consumption, by a vehicle running on pneumatic tires composed of a matrix such as rubber reinforced by cords, such as synthetic fiber cords, due to substituting for cords (A), different cords (C) having different properties from those of cords (A), or due to substituting for rubber (A), different rubber (C) having different properties from those of rubber (A), or due to substituting both different cords and different rubber, or due to changing the construction geometry.

Heretofore in order to make such estimate it has been necessary to actually measure the rolling resistance of the tire.

SUMMARY OF THE INVENTION

Our method consists essentially of the following steps:

1. Establish by experiment the value of the exponent $X_c$ in the following equation relating strain amplitudes $(S_A)_c, (S_B)_c$ and dynamic moduli $(E_A)_c, (E_B)_c$ for the cords in each of two tires A and B, at given frequency of cyclic straining, given temperature, and given average tension:

$$(S_A)_c/(S_B)_c = [(E_B)_c/(E_A)_c]^{X_c} \quad (1)$$

2. Likewise establish for the rubber component, the value of the exponent $X_r$ in the equation:

$$(S_A)_r/(S_B)_r = [(E_B)_r/(E_A)_r]^{X_r} \quad (2)$$

The experimental procedure for carrying out the above two steps is as follows:

(a) Build two references tires (A,B) of identical design except for using a different type of tire cord and/or different type of rubber, and/or different geometry in tire A from the cords, or rubber or geometry in tire B.

(b) For the two types of tire cords and likewise for the two types of rubber, determine the heat generation rate under cyclic tensile straining at a series of temperatures and at a series of strain amplitudes, and express these heat generation rates as polynomial functions of temperature at each strain amplitude for each of the types A and B of tire cords, and likewise for the two types of rubber.

(c) For the tire cords of each type, likewise determine the tensile moduli as polynomial functions of temperature and of strain amplitudes; and for each of the two types of rubber, determine the tensile moduli as function of temperature and strain amplitude. Determination of the heat generation rates and the tensile moduli mentioned above, at a series of temperatures and strain amplitudes, can be carried out by use of the high strain dynamic viscoelastometer described in U.S. Pat. No. 3,969,930 of July 20, 1976 to Prevorsek et al.

(d) Subject the two tires built in step (a) to standard wheel testing, each under the same load; and experimentally measure the tire temperatures under steady state operation at a selected set of points through cross sections of the sidewall, crown, and bead.

(e) Solve by computer the heat balance equations set out below using trial sets of values of the strain amplitudes for the cord and rubber to calculate temperatures through the tire profile, starting at the known surface temperature; and repeat the solution iteratively, varying the trial values of strain amplitudes until the temperature profile resulting from the solution matches the measured temperature profile. (See U.S. Pat. No. 3,934,452 of Jan. 27, 1976 to Prevorsek et al.).

(f) Using the temperatures and strain amplitudes of the cords and rubber in the two tires (A,B) thus arrived at, and the experimentally determined tensile moduli at said temperature and strain amplitudes, the computer uses equations (1) and (2) above to determine the values of $X_c$ and $X_r$.

3. For the cord and rubber which will go into a third, untested, tire C:

Experimentally determine relationship between strain amplitudes $(S_C)_c$ and heat generation rates $(Q_C)_c$—represented by area corresponding to hysteresis loss during cyclic straining of such cords—at given frequency, temperature, and average tension (representing the effect of given inflation pressure on a tire being tested); and express the heat generation rates $(Q_C)_c$ found at each tested set of conditions as polynomial functions of the cord strain amplitude used; and likewise determine the relationship between the strain amplitudes of the rubber, $(S_C)_r$, and the heat generation rates $(Q_C)_r$ under given conditions.

4. For the untested tire C, having different cords and/or different rubber and/or a different tire geometry, the computer determines the temperature profile under steady state operating conditions, through each region of tire C, as follows:

(a) In the beginning the cyclic strain amplitudes being imposed as the tire is rotated are unknown. Therefore, a set of estimated strain amplitude values is taken, and an initial computer result for the temperature profile through each region of tire C is produced by the solution of heat balance equations, appropriate for each region of the tire, set out below.

(b) Using such first approximate temperature profile obtained in the above step 4(a), the computer uses for each region of the tire, the cord and rubber moduli experimentally found to correspond to such strain amplitudes and approximate temperature; and uses Equations (1) and (2) above, applying the previously found values of $X_c$ and $X_r$, to compute a new set of strain amplitudes. With these values of strain amplitudes, the computer returns to step 4(a).

This iteration procedure is repeated until the resulting temperatures, moduli and strain amplitudes satisfy simultaneously the heat balance equations for the untested tire C, and the power relation between moduli and strain amplitudes in a tested tire vs. those found for the untested Tire C.

5. Having established the temperature profile in the tested and the untested tire, the computer sums the heat flux through all areas constituting the tire surface to obtain the total energy loss from the tire surface lost as waste heat during the cyclic straining of said tested and untested tires.

BRIEF DESCRIPTION OF DRAWINGS

FIG. 1 is a graph showing tensile moduli of tire cords as determined in dynamic tests, plotted against temperature maintained in the testing chamber, at two different cyclic strain amplitudes; the cords tested being a polyethylene terephthalate ("PET") cord and a nylon ("N-6") cord.

FIG. 2 is a graph displaying as Curves A, plots of heat generation rate of a certain nylon tire cord, subjected to cyclic straining of three different strain amplitudes, plotted against temperatures maintained in the testing chamber. Curves C likewise display heat generation rate against temperature for a different nylon cord.

FIG. 6 illustrates the method of determining area elements of the inside and outside tire surfaces.

FIG. 7 plots the relation between energy loss from a tire as estimated in accordance with this invention, versus that determined by mesuring the rolling resistance.

DETAILED DESCRIPTION

Heat Balance Equations of Tire

Figure 3:
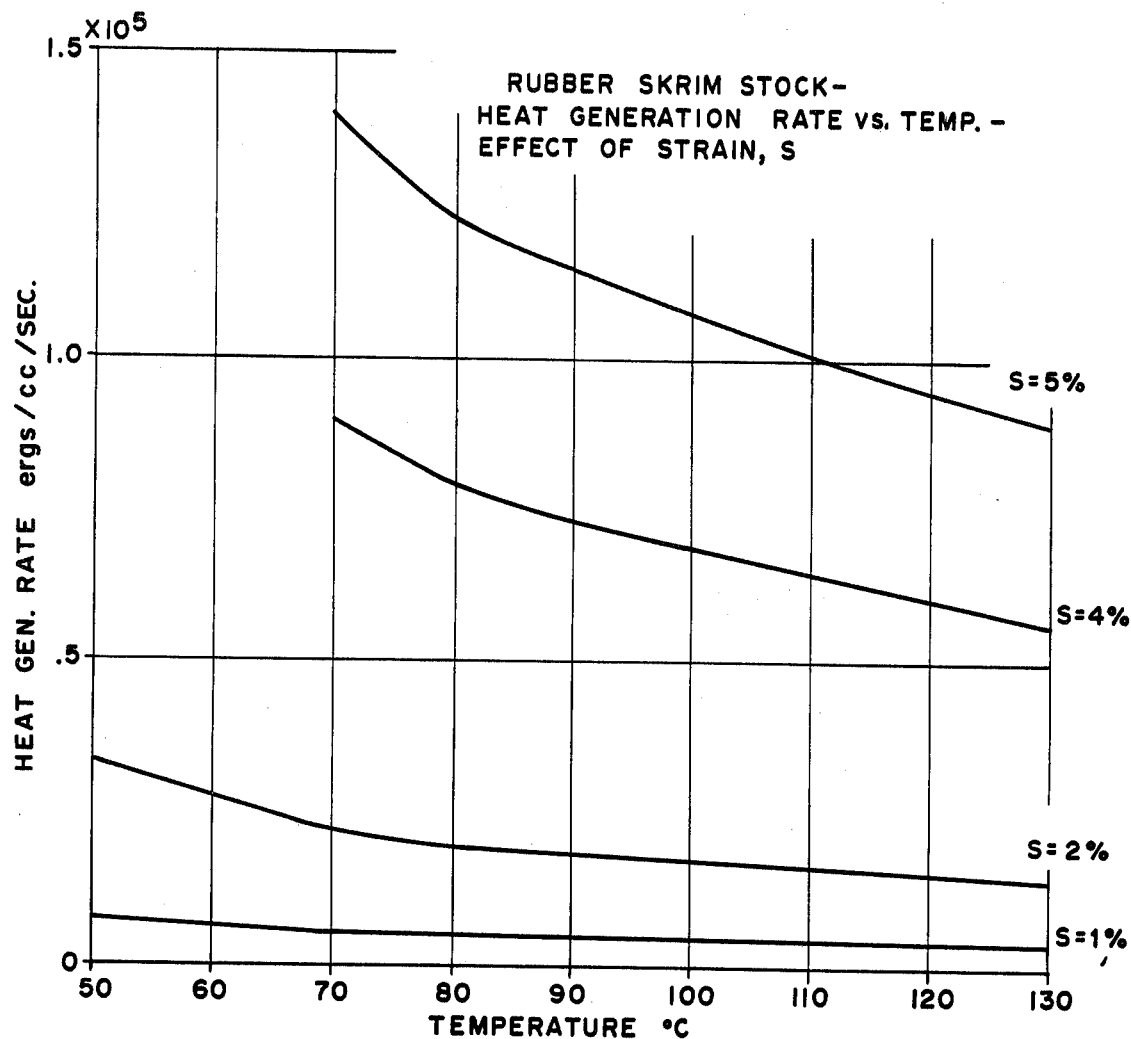
FIG. 3 similarly displays heat generation rate versus temperature for rubber skrim stock.

The following heat balance equations relate the change of temperature at each successive small volume zone in a tire to the rates of heat generation by the cord, $(Q)_c$, due to the cyclic straining at amplitude $(S)_c$ of the cord within that zone and by the rubber, $(Q)_r$, due to the cyclic straining at amplitude $(S)_r$ of the rubber within that zone.

Due to the difference in geometry, different sets of equations are used for the sidewall and the shoulder regions.

(A) In the sidewall:

$$\rho C(\partial T/\partial t) = K(\partial^2 T/\partial x^2) + Q$$

where the meanings of the symbols are:

$\rho$ = density at a given point in the tire;
(For points in the reinforced zone, $\rho$ is averaged as:
$\rho = \rho_c V_c + \rho_r(1 - V_c)$ where $\rho_c$ is cord density and $\rho_r$ is rubber density);

$V_c$ = volume fraction composed of cords, in the reinforced zone;

$(1 - V_c)$ = volume fraction composed of rubber, in the reinforced zone;

C = heat capacity per unit weight at the given point;
(For points in the reinforced zone, C is averaged as:

$$C = C_c w_c + C_r(1 - w_c)$$

where $w_c$ = weight fraction of cords in the reinforced zone;
$(1 - w_c)$ = weight fraction of rubber in the reinforced zone);

$\partial T/\partial t$ = time rate at which temperature at a given position in the sidewall is changed due to the combined effect of heat generation during cyclic straining and of conductive flow of heat.

$\partial T/\partial x$ = change of temperature between the given point in the sidewall and the next adjoining point in the direction of heat flux, at given time (heat flux being assumed to be along the outward normal to the sidewall);

K = thermal conductivity at the given point in the sidewall;
(For points in the reinforced zone, averaged as:
$K = K_c V_c + K_r(1 - V_c)$, $K_c$ being that for cords and $K_r$ that for rubber);

Q = time rate of heat generation due to cyclic straining at given point (at given frequency, given temperature, and given average tension);
(For points in the reinforced zone, averaged as:
$Q = Q_c V_c + Q_r(1 - V_c)$ where subscripts c and r refer to cord and rubber, respectively);

And the boundary conditions are:
$K|\partial T/\partial r| = h|T_s - T_a|$, wherein h is heat transfer coefficient from the sidewall surface to the air at that surface and $|T_s - T_a|$ is the numerical temperature difference between the sidewall surface (inner or outer surface, respectively) and air in contact with that surface;

(B) In the crown and shoulder zone
(B) (1) In the inner region of FIG. 2:

$$\rho C \partial T/\partial t = K[1/r)\partial/\partial r\,(r\partial T/\partial r) + (1/r^2)\partial^2 T/\partial \eta^2] + Q$$

with boundary conditions given by:
$K(\partial T/\partial r) = h(T - T_a)$ at inner surface and $\partial T/\partial \theta = 0$ at the ends; where r and $\theta$ are the polar coordinates indicated in FIG. 2 and the remaining symbols have the above meanings:

(B) (2) In the other two regions of FIG. 2

$$\rho C \partial T/\partial t = K(\partial^2 T/\partial x^2 + \partial^2 T/\partial y^2) + Q$$

with boundary conditions given by:

$$K|\partial T/\partial x| = h|T - T_a|$$

$$-K(\partial T/\partial y) = h(T - T_a)$$

at the surfaces in contact with air, and by $(\partial T/\partial x) = 0$ at the ends; and for the overlapping areas, found by iteration going from each region to the adjoining ones, as each recalculation of the T's is carried out.

Rigorously, the modes and amplitudes of cyclic straining of both the cord and rubber vary from point to point within a tire. Thus, the cord is subjected to tension throughout the tire under normal design and operating conditions. The rubber, however is subjected to tension, compression and shear depending on the position. Quantitative treatment of these varying modes of deformation in a rigorous manner is extremely difficult. So, we take a simplified approximate approach and represent the cyclic deformations of cord and rubber by use of two tensile strain amplitudes of cord, one at the sidewall and one at the shoulder; and two equivalent tensile strain amplitudes of rubber, one at the sidewall and one at the shoulder.

The approximation enables us to match the experimentally measured temperature profile of tire under operation with the temperature profile obtained by solving the heat transfer equations by finite difference approximation techniques.

EXAMPLE

In this example, we illustrate the application of the method outlined above by considering a specific case. We will apply the method to estimate the energy loss from an untested tire and compare the loss with its rolling resistance determined experimentally.

Step 1 and 2: Experimental determination of the empirical power indices $X_c$ and $X_r$ Two passenger tires of identical geometry were built, one with N-6 cords (tire A), the other with PET cords (tire B); the two cords were used in such quantities that the cross-sectional areas of the cords per unit cross-sectional area of tire were equal. Separately, the N-6 and PET cords were subjected to cyclic deformation tests to determine the modulus of each as the function of temperature and strain amplitude. A typical example of the results of this measurement is shown in FIG. 1.

Also, separately, the heat generation rates of the cords, at a series of temperatures and at several cyclic strain amplitudes, were determined by use of a high strain dynamic viscoelastometer of U.S. Pat. No. 3,969,930. The result for the N-6 cord is shown in FIG. 2 (Curve A). For the rubber which was used in building the tire, its heat generation rate was also measured as function of temperature and cyclic strain amplitude. The result is shown in FIG. 3.

Figure 4:
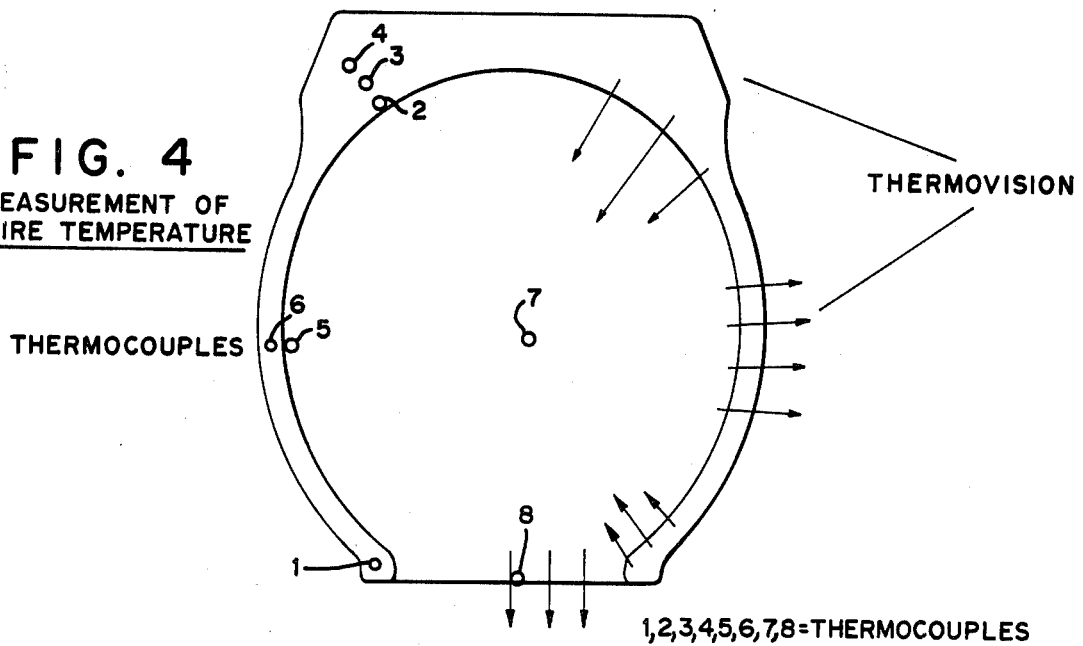
FIG. 4 depicts a perpendicular cross section through a tire, showing the location of eight thermocouples to be used for measuring temperatures developed when testing the tire as it is rotated on a testing wheel. Measurement of surface temperatures at shoulder and sidewall by "thermovision" (infrared) is also indicated; and also the general direction of heat flow through the tire to the inside air and to the outside air.

The two tires were then loaded and run on the testing wheel and temperatures were measured at the points shown in FIG. 4.

Then the heat balance equations, shown above at (A) and (B) for sidewall and for crown and shoulder, respectively, were solved simultaneously using various values of strain amplitudes of cord and rubber at the sidewall and shoulder region. The trial solution was repeated until the calculated temperatures matched the measured temperatures.

From the effective strain amplitudes thus arrived at, the values of the exponents $X_c$ and $X_r$ were determined by using the previously set out power relationships between cyclic strain amplitudes and the moduli corresponding to these temperatures and strain amplitudes, viz:

$$(S_A)_c/(S_B)_c = [(E_B)_c/(E_A)_c]^{X_c};$$
$$(S_A)_r/(S_B)_r = [(E_B)_c/(E_A)_c]^{X_r}$$

Table I below shows the results.

Averaging the values obtained, it was thus determined that for the sidewall region, $$X_c \approx 0.54 \quad X_r \approx 0.23$$

For the shoulder region and bead region, similar procedures have given $$X_c = 0.54 \quad X_r = 0.49$$

It is seen that $X_c$ has the same value in the different regions but the $X_r$ values differ, reflecting the difference in the response of rubber strain to the change in cord modulus in different regions.

If the modulus vs. strain relations were strictly linear and simple, the indices $X_c$ and $X_r$ should be 1.0. The values of $X_c$ and $X_r$ which are smaller than 1 show the extent of nonlinearity of the system.

Step 3. Experimental Determination of the Heat Generation Rate of Cord and Rubber Which Go Into the New Untested Tire, As Functions of Temperature and Strain Amplitude Using the high strain dynamic viscoelastometer of U.S. Pat. No. 3,969,930 the heat generation rates of the particular nylon-6 tire cord and rubber used in the untested tire C were determined. The results for the cord are shown in FIG. 2, curve C. The corresponding relationship for rubber is shown in FIG. 3.

Using the results of these measurements, the heat generation rates were expressed as polynomial functions of cyclic strain amplitude for cord at various temperatures; and as a function of the strain amplitude and temperature for the rubber, so that the data can be regenerated easily in a digital computer, when the temperature and strain amplitude are given.

The polynomial expressions and the numerical values of the coefficients are shown in Table II.

Step 4. Solution of the Heat Balance Equations to Obtain the Temperature Profile in the Untested Tire C By computer the heat balance equations shown at (A) and (B) above using the heat generation rate data experimentally obtained per step 3, were solved to obtain the temperature profile in the untested tire. The computer goes through the following iteration procedure.

Iteration Procedure (a) The computer starts at time=0, when the air temperature inside the tire, Ta(in), the temperatures at each point throughout the tire, T(x,y), and the outside air temperature, Ta(out) are all the same, i.e. Ta(in)=T(x,y)=Ta(out).

(b) Now the computer takes a time step t as a small interval of time during which the tire operates at the given speed under the given load. Using a set of approximate cyclic strain amplitudes, a temperature profile through the cross-section of each region of the tire is calculated by use of the heat balance equations.

Figure 5:
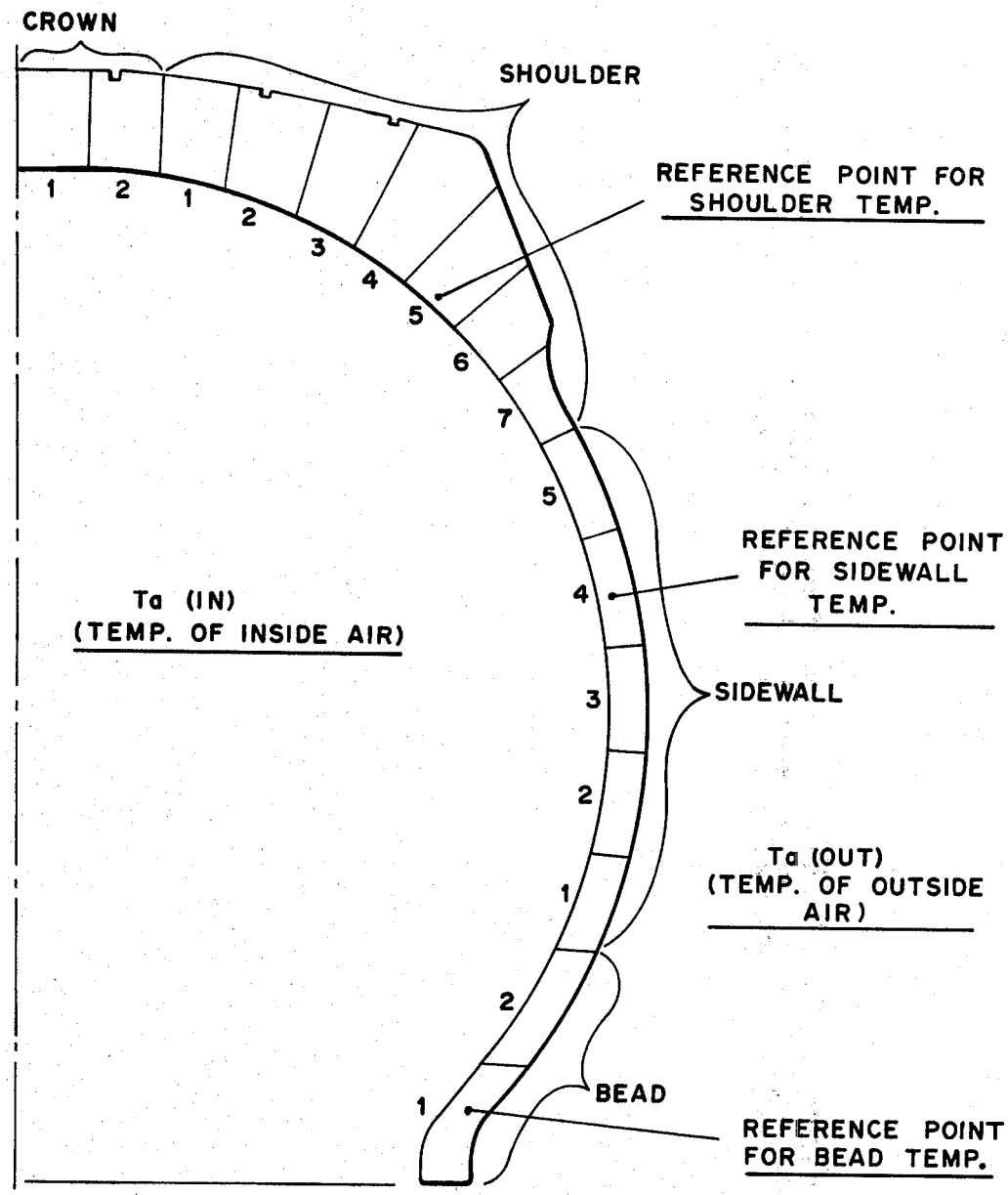
FIG. 5 depicts a tire cross section with the four principal regions (crown, shoulder, sidewall and bead) subdivided into smaller regions for purposes of the computer determination of strain amplitudes and temperatures. A reference point or representative point for shoulder temperature, and one for sidewall temperature, and one for bead temperature are also indicated in FIG. 5.

(c) Using the temperatures thus calculated and the approximate strain amplitudes, at the reference points shown in FIG. 5, the corresponding moduli of cord and rubber at those points in the regions of shoulder, sidewall and bead are given by the experimentally determined moduli for these temperatures and strain amplitudes.

(d) Using these values of moduli and the power equations of steps 1 and 2, the computer calculates the strain amplitudes of cord and rubber in each of the three regions.

(e) Using these strain amplitudes and the current calculated value of inside air temperature, Ta(in), the computer again solves the heat balance equations to obtain the temperature profile in the tire cross-section.

(f) The value of $T_{a(in)}$ is updated by satisfying the condition that heat gained from the tire by the inside air equals heat lost from the inside air through the wheel:

$$\Sigma(\delta A_{(in)}) \cdot h \cdot (T_{s(in)} - T_{a(in)}) + A_w h_w (T_{a(in)} - T_w) = 0,$$

where $\delta A_{(in)}$ is a small element of inside surface area of the tire;
$A_w$ is the inside surface area of the wheel rim;
h is heat transfer coefficient between tire surface and air;

$h_w$ is heat transfer coefficient between air and the inside wheel rim surface;

$T_{s(in)}$ in tire temperature at the inside surface element δA;

$T_{a(in)}$ is inside air temperature;

$T_w$ is inside wheel rim temperature.

(g) The computer then returns to step (b) of this iteration procedure and repeats the foregoing steps (b)–(g) until the calculated temperature profile does not change any more.

Table III shows the temperature profiles of tire A (tested) and tire C (untested).

The results shown in this Table III indicate that the temperature of tire C is considerably higher than that of tire A.

Step 5. Calculation of Total Energy Loss from the Tire

From the values of tire surface temperatures, the computer calculates the total energy loss from the tire to air by the integration of $$Q_T = \int_A h(T_s - T_a)dA$$

This integration is done for both inside and outside surfaces of the tire. Referring to FIG. 6, the area element dA in the above equation is given by $$dA = 2\pi R dl$$

where R is the radial distance from the center of rotation of the tire to the area element.

Integration results are as follows.

| | Energy Loss (in calories/tire · sec.) |
|---|---|
| Tire A | 187 |
| Tire C | 218 |

The energy loss from a tire is directly related to the "rolling resistance" of the tire, which can be measured by use of a special facility like that of Calspan Corporation of Buffalo, N.Y.

FIG. 7 illustrates an example of the relation between the energy loss estimated in accordance with this invention, and as determined by measurement of the actual rolling resistance of a tire.

$$Q_c(S_c, T_i) = \sum_{j=1}^{m} a_{i,j} (S_c)^{j-1} \quad \text{(II-1)}$$

The coefficients $a_{i,j}$ suitably are determined for i=1 to 7 or 8 values of temperature and j=1st to 4th power of the variable, $S_c$. When a set of values of $T_i$ and $S_c$ are given, Eq. (II-1) is used to calculate $Q_c(S_c, T_i)$ and $Q_c(S_c, T_{i+1})$ such that $T_i < T < T_{i+1}$ and then the value of $Q_c(S_c, T)$ is calculated by a simple interpolation procedure.

The following table shows, by way of illustration, the values of $a_{i,j}$ (for the cord of the untested tire C) corresponding to a series of 8 temperatures, and with $S_c$ expressed in percent. These values of $a_{i,j}$ generate the points, on the curves "C" of FIG. 2, which relate $Q_c$ to temperature at the three values of $S_c$ shown in FIG. 2 for the nylon 6 cords of tire C.

| | | Values of $a_{i,j}$ | | | |
|---|---|---|---|---|---|
| | | ($Q_c$ in $10^4$ erg/cm. sec with 10 cps frequency; $S_c$ is in %) | | | |
| | | | $a_{i,j}$ | | |
| i | $T_i$(° C.) | J = 1 | j = 2 | j = 3 | j = 4 |
| 1 | 50 | −0.0367 | 4.80 | −13.9 | 12.8 |
| 2 | 70 | −0.0396 | 5.09 | −14.9 | 13.8 |
| 3 | 90 | 0.00639 | 0.385 | −2.72 | 7.03 |
| 4 | 105 | 0.00727 | 0.284 | −1.21 | 6.16 |
| 5 | 120 | −0.00195 | 1.21 | −1.76 | 6.23 |
| 6 | 135 | −0.00888 | 1.91 | −2.18 | 5.30 |
| 7 | 150 | 0.015 | −0.536 | 3.95 | 0.67 |
| 8 | 160 | −0.00321 | 1.33 | −0.771 | 2.85 |

2. For rubber:

Rubber behaves as a linearly viscoelastic substance and the heat generation rate is proportional to the square of strain amplitude at a range of temperatures.

The following equations relate $Q_r$ to temperature and cyclic strain amplitude, as found experimentally using the high strain dynamic viscoelastimeter. ($Q_r$ is in units of $10^5$ erg/cc.sec with 10 cps frequency; $S_r$ is given in % and T in ° C.):

(a) $Q_r(S_r,T) = 0.25 (S_r)^2(0.424 − 0.00285T)$; T ≦ 80° C.

(b) $Q_r(S_r,T) = 0.25 (S_r)^2(0.287 − 0.00113T)$; T > 80° C.

These equations are represented by the family of curves of FIG. 3.

Table I

| | | | Determination of $X_c$ and $X_r$ | | | | | | |
|---|---|---|---|---|---|---|---|---|---|
| | | | (Passenger tire, Sidewall) | | | | | | |
| | | | PET Cord (Tire B) | | N-6 Cord (Tire A) | | | | |
| Speed MPH | Load lbs. | T° C. | Cord Strain Amplitude % | Rubber Strain Amplitude % | T° C. | Cord Strain Amplitude % | Rubber Strain Amplitude % | Ratio of Pet Modulus: N-6 Modulus | $X_c$ | $X_r$ |
| 35 | 2310 | 66.1 | 0.72 | 16.4 | 66.7 | 0.86 | 18.0 | 1.480 | 0.51 | 0.24 |
| 50 | 2190 | 67.2 | 0.67 | 16.3 | 70.0 | 0.84 | 17.7 | 1.487 | 0.57 | 0.21 |
| | 2310 | 70.0 | 0.69 | 16.8 | 71.7 | 0.89 | 18.5 | 1.494 | 0.55 | 0.24 |

TABLE II

Polynomial Expressions for the Heat Generation Rate as Function of Temperature ($T_i$) and Strain Amplitude ($S_c$)

1. For cord, at given temperature, $T_i$, and undergoing cyclic strain at amplitude $S_c$:

TABLE III

Steady State Temperature Profiles of Tire A (Tested) and Tire C (Untested) (65 mph) (T in ° C.)

| | | Surface Temps. | | | |
|---|---|---|---|---|---|
| | Position | Tire A | | Tire C | |
| Region | (see FIG. 5) | Inside | Outside | Inside | Outside |
| Crown | 1 | 80.9 | 55.7 | 94.2 | 57.9 |
| | 2 | 80.9 | 55.7 | 94.2 | 57.9 |

TABLE III-continued

Steady State Temperature Profiles of Tire A (Tested) and Tire C (Untested) (65 mph) (T in ° C.)

| | | Surface Temps. | | | |
|---|---|---|---|---|---|
| | Position | Tire A | | Tire C | |
| Region | (see FIG. 5) | Inside | Outside | Inside | Outside |
| Shoulder | 1 | 80.9 | 55.7 | 94.2 | 57.9 |
| | 2 | 83.5 | 56.3 | 97.4 | 60.2 |
| | 3 | 91.2 | 51.6 | 106.9 | 54.6 |
| | 4 | 100.5 | 56.9 | 118.3 | 60.6 |
| | 5 | 104.8 | 80.9 | 124.0 | 90.5 |
| | 6 | 99.8 | 80.7 | 118.7 | 91.8 |
| | 7 | 92.5 | 77.5 | 110.2 | 89.2 |
| Sidewall | 1 | 87.8 | 66.6 | 104.1 | 75.7 |
| | 2 | 79.4 | 61.1 | 94.6 | 68.6 |
| | 3 | 71.0 | 54.6 | 85.1 | 61.1 |
| | 4 | 62.6 | 48.1 | 75.6 | 54.4 |
| | 5 | 78.9 | 64.4 | 94.3 | 73.3 |
| Bead | 1 | 104.8 | 80.9 | 124.0 | 90.5 |
| | 2 | 96.4 | 73.3 | 113.8 | 83.0 |

We claim:

1. Process of estimating the energy loss from a tire during operation, without wheel testing of that tire, comprising:

(a) wheel testing two reference tires, having different construction parameters and measuring the temperatures at a few points within the tire body;

(b) measuring with a high strain dynamic viscoelastometer the heat generation rate and dynamic tensile moduli (at various temperatures, strain frequencies and tensions) of the cords and rubber used in each tire, thus determining the values of the exponents "X" in the general equation relating cyclic strain amplitude, S, in the tire cord and in the rubber of each tire vs. the dynamic tensile moduli, E, for cords and rubber at given temperature, in the form: $S_A/S_B = (E_A/E_B)^X$;

(c) for the untested tire, determining cyclic strain amplitudes and temperature profiles through the tire by computer solution of the heat balance equations through the tire, imposing the simultaneous condition that the above relation of step (b) between tensile moduli and strain amplitudes must be satisfied, at the existing temperature in each small region of the tire;

(d) from the surface temperatures at each small area of the untested tire, thus arrived at, calculating the sum of $Q_T$ over the whole surface area, A, of the tire: $Q_T = \int_A h(T_s - T_a) dA$, where "h" is heat transfer coefficient from surface to surrounding air (inside and outside), and $(T_s - T_a)$ is temperature difference between each small surface area and the air in contact therewith.

* * * * *

UNITED STATES PATENT AND TRADEMARK OFFICE
CERTIFICATE OF CORRECTION

PATENT NO. : 4,150,567
DATED : April 24, 1979
INVENTOR(S) : Dusan C. Prevorsek, Young D. Kwon, Raj K. Sharma It is certified that error appears in the above-identified patent and that said Letters Patent are hereby corrected as shown below:

In the drawings, at the Figure on the cover sheet and in Fig. 4, add the registered trademark symbol and the following generic termology, so that the legend at the right of these Figures will read;

---THERMOVISION® thermographic instrument---;

and at col. 3, line 14, change the words --"thermovision" (infrared) - to ---a THERMOVISION® infrared sensitive thermographic instrument---.

Signed and Sealed this

Thirtieth Day of October 1979

[SEAL]

Attest:

RUTH C. MASON
Attesting Officer

LUTRELLE F. PARKER
Acting Commissioner of Patents and Trademarks